United States Patent
Magiawala et al.

(10) Patent No.: US 6,741,169 B2
(45) Date of Patent: May 25, 2004

(54) TIRE TREAD INTEGRITY MONITORING SYSTEM AND METHOD

(75) Inventors: Kiran R. Magiawala, Hawthorne, CA (US); Barry Dunbridge, Torrance, CA (US); George W. McIver, Redondo Beach, CA (US); David L. Juzswik, Commerce, MI (US); Timothy DeZorzi, South Lyon, MI (US); Albert M. Straub, Ann Arbor, MI (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/900,323

(22) Filed: Jul. 6, 2001

(65) Prior Publication Data

US 2003/0006890 A1 Jan. 9, 2003

(51) Int. Cl.[7] .................................................. B60Q 1/00
(52) U.S. Cl. ...................... 340/438; 340/442; 340/443; 340/444; 340/447; 73/146.2; 73/146.3; 73/146.4; 73/146.5; 73/146.8
(58) Field of Search ................................ 340/438, 442, 340/443, 444, 447; 73/146.2–146.5, 146.8

(56) References Cited

U.S. PATENT DOCUMENTS

| 4,246,567 A | | 1/1981 | Miller |
|---|---|---|---|
| 4,297,876 A | | 11/1981 | Weiss |
| 4,327,579 A | | 5/1982 | Weiss |
| 4,337,660 A | | 7/1982 | Weiss |
| 4,570,152 A | | 2/1986 | Melton et al. |
| 5,483,827 A | * | 1/1996 | Kulka et al. ................ 73/146.5 |
| 5,754,102 A | | 5/1998 | Yanase |
| 5,948,976 A | | 9/1999 | Newman |
| 6,028,508 A | | 2/2000 | Mason |
| 6,088,101 A | | 7/2000 | Newman |
| 6,089,085 A | | 7/2000 | Newman |
| 6,118,369 A | * | 9/2000 | Boesch ......................... 340/443 |
| 6,448,891 B2 | * | 9/2002 | Barnett ......................... 340/438 |

* cited by examiner

Primary Examiner—Daryl C. Pope
(74) Attorney, Agent, or Firm—Tarolli, Sundheim, Covell & Tummino L.L.P.

(57) ABSTRACT

A tire monitoring method and apparatus is provided to predict tire tread separation for a tire on a wheel of a vehicle. This may involve monitoring a parameter of a tire of a vehicle over time and comparing information regarding the monitored parameter (over time) with a reference threshold value of the parameter (over time). The method may also include providing information to a driver based on the comparison. The parameter may be acceleration (axial, radial or longitudinal) along an axis of the tire. The parameter may also be tire imbalance, temperature inside the tire, speed of the tire, load and/or pressure, for example. Information regarding the comparison may be transmitted to a driver if the monitored parameter exceeds the reference threshold value for a predetermined amount of time.

38 Claims, 4 Drawing Sheets

TIRE TREAD INTEGRITY MONITORING SYSTEM AND METHOD

CROSS REFERENCE TO RELATED APPLICATIONS

This application is related to U.S. Pat. No. 6,278,361, filed Dec. 3, 1999, the subject matter of which is incorporated herein by reference. This application is also related to U.S. patent application Ser. No. 09/900,324, filed Jul. 6, 2001, entitled "Tire and Suspension Warning And Monitoring System," the subject matter of which is incorporated herein by reference.

BACKGROUND OF THE INVENTION

1. Field of the Invention

This invention generally relates to tire treads, and more particularly relates to monitoring tire treads.

2. Discussion of the Related Art

The handling performance of a motor vehicle (e.g., vehicle steering, braking and fuel consumption) is affected by the condition of the tires. Handling performance can be affected by improper tire inflation, abnormal tire tread wear and out of balance conditions.

It is estimated that ten percent of tires that would normally wear out at 40,000 miles actually wear out at 30,000 miles due to abnormal tire tread wear. As a result, over the course of a vehicle life of 120,000 miles, the vehicle may need an additional set of tires at an average cost of $300. Thus, it is desirable to alert the driver of abnormal tire imbalance.

A tire monitoring system available from SmartTire Systems, Inc. (www.smartire.com) uses wireless technology to monitor the air pressure and temperature in vehicle tires using wireless wheel-mounted sensors and a display receiver mounted within sight and reach of the driver. A sensor is mounted on each wheel and each tire is mounted over the sensor. Each sensor may contain a pressure transducer, a temperature transducer, a centrifugal switch, a radio transmitter and a lithium battery. The display module shows required pressure, actual pressure, pressure status and temperature. While this system provides temperature and pressure information, it does not provide information about tread wear and balance.

In addition, anti-lock braking systems (ABS) and integrated vehicle controllers (IVC) may require the input of information indicating the wheel rotational speed for each wheel. A separate wheel speed sensor may be provided for each wheel. This may typically include a toothed wheel made of a magnetic disk attached co-axially to a corresponding axle rotatably supporting a tire and a pick-up coil arranged adjacent each toothed wheel with an interval therebetween to provide an alternating sensor signal having a frequency indicative of the speed of each tire.

U.S. Pat. No. 6,278,361 discloses a system and method for monitoring vehicle conditions affecting tires including tire tread wear, shock absorber performance, balance condition of the vehicle tire, and rotational speed of a vehicle wheel.

SUMMARY OF THE INVENTION

Embodiments of the present invention may provide a tire monitoring method that includes monitoring a parameter of a tire of a vehicle over time and comparing information regarding the monitored parameter (over time) with a reference threshold value of the parameter (over time). The method may also include providing information to a driver based on the comparison. The parameter may be acceleration (axial, radial or longitudinal) along an axis of the tire. The parameter may also be tire imbalance, temperature inside the tire, speed of the tire, load and/or pressure, for example. Information regarding the comparison may be transmitted to a driver if the monitored parameter exceeds the reference threshold value for a predetermined amount of time. This information may be used to detect, monitor or predict tire tread separation.

Embodiments of the present invention may also provide a tire monitoring system that includes at least one sensor to monitor a parameter of a tire of the vehicle, a memory device to receive and store signals from the sensor indicative of the parameter over time, and a processing device to couple to the memory device and to compare information regarding the parameter over time with a reference threshold of the parameter over time. A display device (or audio device, or other type of indicator) may display (or relay) information to a driver regarding the tire. The sensor system may provide a warning indication to the display device if the parameter exceeds the threshold value for a predetermined amount of time. The warning indication may relate to an actual or a predicted tire tread separation.

The sensor may be a radial accelerometer to monitor radial acceleration, an axial accelerometer to monitor axial acceleration and/or a longitudinal accelerometer to monitor longitudinal acceleration. The sensor may further be a tire pressure sensor, a temperature sensor and/or a speed sensor.

Other features of the invention will become apparent from the following detailed description taken in conjunction with the annexed drawings, which disclose preferred embodiments of the present invention.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION OF PREFERRED EMBODIMENTS

Figure 1:
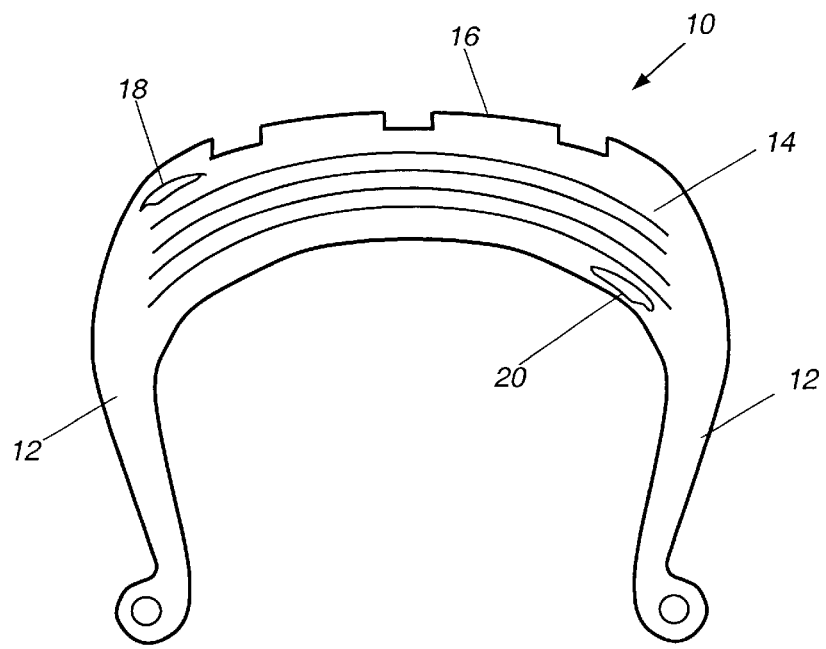
FIG. 1 is a cross sectional view of a deformable structure in the form of a tire.

In the following detailed description, like reference numerals and characters may be used to designate identical, corresponding, or similar components in differing drawing figures. Furthermore, in the detailed description to follow, example sizes/models/values/ranges may be given, although the present invention is not limited thereto. Well-known power connections and other well-known elements have not been shown within the drawing figures for simplicity of illustration and discussion and so as not to obscure the invention.

Embodiments of the present invention may provide a system of in-tire safety sensors (i.e., a sensor system) for monitoring relevant tire parameters and tire operating conditions that are relevant to the current state and the anticipated state of the tire tread. The sensor system may predict a future problem by observing certain parameters over time. The sensor system may also observe ongoing problems such as tire imbalance. The sensor system may thereby be used to detect, monitor or predict tire tread separation.

The sensor system may monitor two aspects that will hereafter be described, namely actual ongoing tread separation and direct operating conditions.

More specifically, the sensor system may measure actual ongoing tread separation of the rotating tire/wheel assembly by means of a Harmonic Dynamic Power Steering (HDPS) aspect of the sensor system. The actual ongoing tread separation may be caused by non-uniform cylindrical asymmetrical changes that may be the symptom of tread-to-tire material movements such as tread peeling, tread bubble formation, missing tread patches/chunks, etc. These parameters may be observed over a time period to determine if an actual problem (such as tire tread separation) is occurring.

The sensor system may further measure direct operating conditions by means of a Stress Factor Integrated Measurement (SFIM) aspect of the sensor system. These direct operating conditions may lead to severe tire stress and high critical temperature which (if sustained for a sufficient period of time) may strongly increase the probability of tread separation. For example, a critical temperature region may be located at the belt-to-tread interface (especially at the edges), where the initiation of tread separation usually occurs because of its low material binding energy to resist the thermo-mechanically induced, chemical degradation and resulting material peeling effects. The sensor system may indirectly measure this critical temperature (since direct measurement is difficult) as will be described. By utilizing these parameters and observing them over a time period, a prediction may be made regarding a future problem.

Before discussing the sensor system in detail, a brief discussion of basic thermo-mechanical chemical degradation will be provided. It is well known that most failure mechanisms are accelerated thermally. This may be because a higher material temperature increases the rate of chemical changes at a molecular level by dumping more energy into the underlying chemical change process, which constitutes the failure phenomenon. Similarly, mechanical motion may dump more energy into the failure process thermally or by accelerating the motion of the molecules. A well-known equation for the occurrence of a thermally induced failure mechanism is the following Equation 1:

$$\text{Failure Rate} = R = (1/\text{MTBF}) = ce^{-(E_a/kT)}, \quad (1)$$

where c is a constant, MTBF is the mean time between failures, and $E_a$ is the activation energy associated with the specific thermally induced mechanism (e.g., the level of thermal energy required to enable the failure process to occur). The rate of progression of the process is exponentially dependent on the ratio of the activation energy relative to the kT=Boltzmann energy factor for the temperature (T) of the material (k=Boltzmann constant=$1.38 \times 10^{-23}$).

Based on Equation 1, it may be seen that chemically induced failure rates (R) of materials may be exponentially dependent on the operating temperature (T) of the material.

FIG. 1 illustrates a tire 10 that includes sidewalls 12 connected by belts 14, and a crown or tire tread 16 on top of the belts 14. For illustration purposes, the tire 10 also is shown as having a first separation 18, and a second separation 20. The first and second separation 18 and 20 may be the result of chemical decomposition or devulcanization. It is desirable to notify a driver as soon as a separation occurs or is likely to occur. These separations 18 and 20 may cause ripping of the tread 16 from the sidewalls 12 which may cause wheel imbalance. Other things that cause these separations may include anything that generates heat such as the tire flexing (pressure, speed, load, etc,), the ambient temperature and the amount of braking.

A first type of separation may be called belt edge separation. Belt edge separations may be the result of excessive heat generation due to tire flexing. Circumferential distribution of the separation bubbles may be detected by laser shearogram. A second type of separation may be called chunk failure in which an entire tread lug above the heated belt edge comes off the tread. Excessive heating under cyclic loading may also be the cause for such a failure.

Figure 2:
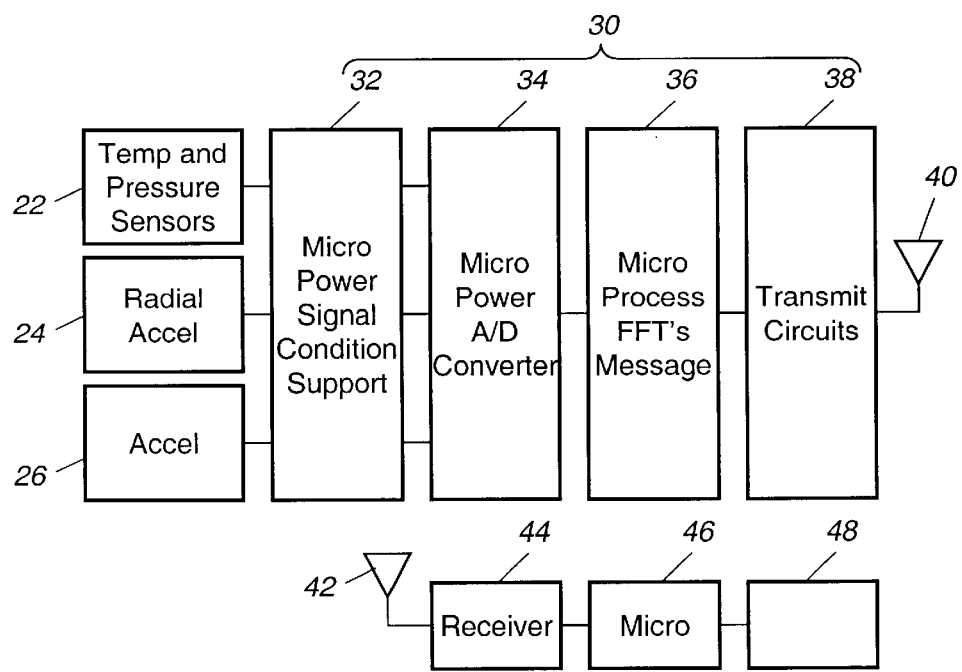
FIG. 2 is a block diagram of a sensor system in accordance with an example embodiment of the present invention.

FIG. 2 is block diagram of an example sensor system in accordance with an example embodiment of the present invention. Other embodiments and configurations are also within the scope of the present invention. As shown in FIG. 2, the sensor system may include one or more sensors for sensing conditions at the vehicle wheel either inside the tire or outside the tire on the wheel rim. A radial accelerometer 24 is provided for measuring a radial acceleration of the tire (or wheel) and an axial accelerometer 26 is provided for measuring a lateral acceleration of the tire (or wheel). As is well known in the art, radial acceleration is the acceleration of the tire (or wheel) in a radial direction (i.e., in a direction perpendicular to the axis of rotation of the tire) and axial acceleration is the acceleration of the tire (or wheel) in an axial direction (i.e., along the axis of rotation of the tire). Axial acceleration may also be called door-to-door acceleration. Additionally, longitudinal acceleration is the acceleration in a longitudinal direction perpendicular to the axis about which the tire rotates (i.e., from front to back of the vehicle). A temperature and pressure sensor 22 (or a temperature sensor and a separte pressure sensor) may also be provided. For example, a temperature transducer and a pressure transducer may be provided and operated in the same manner as in the tire monitoring system of SmartTire Systems, Inc. A range-finding sensor (not shown) may also be provided inside the wheel as will be described below. A centrifugal switch (not shown) may also be included so that the sensor system is switched on only when the vehicle is in motion and the sensor system is switched off or switched into a sleep mode when the vehicle stops so as to extend the battery life.

The radial accelerometer 24 and the axial accelerometer 26 may also be provided as a single two-axis accelerometer as will be discussed below. Alternatively, a three-axis accelerometer may also be provided that includes a longitudinal accelerator.

The radial accelerometer 24 and the axial accelerometer 26 (e.g., in the form of a single two-axis accelerometer) and any other sensor (such as the temperature and pressure sensor 22, the range-finding sensor and the centrifugal switch) may transmit their signals to one or more microprocessors such as a microprocessor 30. At least some and preferably all of the microprocessors are provided on the wheel rim either inside or outside the tire, and are preferably combined into a single microprocessor. One or more of the sensors may be combined with the microprocessor into a single, custom application specific integrated sensor.

As shown in FIG. 2, the microprocessor 30 may have several functions that are shown as separate blocks or separate microprocessors. A first microprocessor 32 (or one portion of the single microprocessor) may receive output signals from the radial accelerometer 24, the axial accelerometer 26, the temperature and pressure sensor 22, the range-finding sensor and the centrifugal switch as well as providing power to the accelerometers 24, 26 and the sensor 22. A second microprocessor 34 (or one portion of the single microprocessor) may be an analog to digital converter to convert the analog signals from the accelerometers 22, 24 and the sensor 26 to digital signals.

A third microprocessor 36 (or another portion of the single microprocessor) may receive the digitized output of the accelerometers 24, 26 and the sensor 26 and determine the tire imbalance, wheel rotational speed and other parameters as may be described below. The third microprocessor 36 may further perform calculations (i.e., make a decision) as to whether or not to transmit information to the driver of the vehicle. This information may relate to an actual measured problem (such as wheel imbalance) or a predicted problem (such as based on an observed parameter over time). If a decision is made by the microprocessor 36 to transmit information to the driver, then a fourth microprocessor 38 (or one portion of the single microprocessor) may wirelessly (or directly) transmit the information from the wheel through a transmitter 40. The third microprocessor 36 may be coupled to or include memory to store data such as a record of temperature, pressure and/or acceleration over time in addition to data regarding an ideally balanced wheel.

The wireless signal may be received by an antenna 42 of a receiver 44 provided onboard the vehicle. The information (signal) may be processed by the microprocessor 46 and sent to an information display 48 (or warning apparatus). The information relayed to the driver may be a warning signal with or without an accompanying audio alert and/or quantitative data showing the relative tire imbalance or other relevant information (such as the predicted problem). The information may relate to parameters of tire tread separation.

The information display 48 may be provided in the dashboard, on the rear view mirror, in an overhead console, on a handheld device or any apparatus to display/notify the user.

Figure 3:
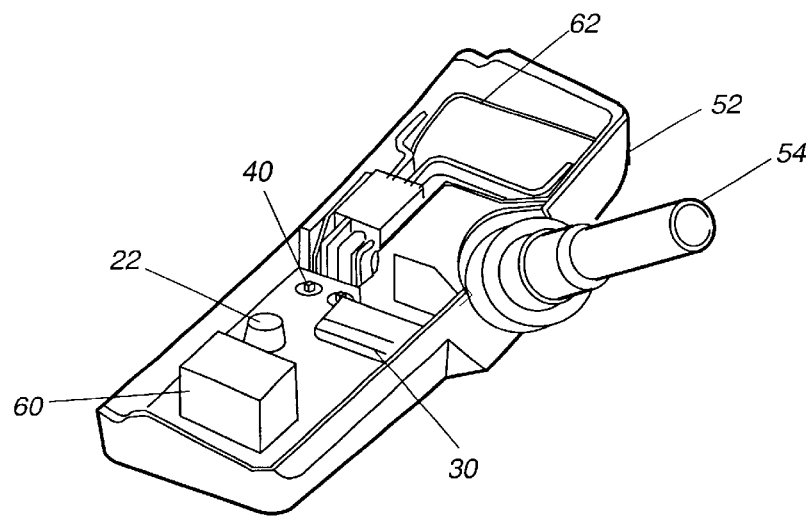
FIG. 3 illustrates a sensor system in accordance with an example embodiment of the present invention.

FIG. 3 is a schematic perspective drawing showing the wheel-mounted portion of a sensor system 100 in accordance with an example embodiment of the present invention. Other embodiments and configurations are also within the scope of the present invention. As shown in FIG. 3, the sensor system 100 may include the radial accelerometer 24 and the axial accelerometer 26 as a single combined two-axis accelerometer 60, the temperature and pressure sensor 26, the microprocessor 30 and the transmitter 40. The sensor system 100 may be provided on the rim inside the tire. In particular, the sensor system 100 may be provided inside a casing 52 that can be adjustably mounted around a valve stem 54 of the tire. While the casing 52 is shown as being provided around the valve stem 54 inside the tire, other locations are possible and are considered to be within the scope of the present invention. For example, the accelerometer 60, the temperature and pressure sensor 22, and the microprocessor 30 may be provided anywhere on the rim as long as the sensors are spaced from the axis of rotation of the wheel and are protected from the elements (e.g., in a casing on the rim, outside the tire, etc.). The protective casing 52 may also be provided inside the tire using a band mount for mounting the casing to the rim without mounting the casing 52 on the valve stem 54.

A battery 62 may also be located within the casing 52 for providing power to the microprocessor 30, the accelerometer 60 and the sensor 22. The battery 62 may be a lithium battery. The casing 52 and the elements provided therein may be virtually maintenance-free. In this regard, while some or all of the functions of the microprocessor 30 may be provided onboard the vehicle in the microprocessor 46, the functions of the first, second, and third microprocessors 32, 34 and 36 may be preferably provided on the wheel unit to conserve battery life. That is, the life of the battery 62 may be conserved by processing the information to determine the tire tread wear with the third microprocessor 36 and transmitting information only if the tire tread wear significantly changes (e.g., deteriorates beyond an acceptable level). By limiting the number of transmissions in this manner, the life of the battery 62 can be extended. It is also within scope of the present invention to continuously or intermittently transmit the output signals from the accelerometer 60 and/or the sensor 22 to the receiver 44 and to process the signals with the microprocessor 46 rather than the third microprocessor 36.

The acceleration of the tire (or wheel), such as the radial and/or axial acceleration of the tire (or wheel), may be used to provide information regarding the tire tread wear, shock absorber performance, balance condition and/or wheel rotation speed. In addition, a radial signal frequency may be indicative of wheel rotational speed and can be used to provide wheel rotational speed data to a vehicle controller such as an anti-lock braking system or an integrated vehicle controller. The specific operation of the sensor system's sensors is set forth in U.S. patent application Ser. No. 09/900,324, filed Jul. 6, 2001, the subject matter of which is incorporated herein by reference.

For a rotating tire, the tread separations along a periphery of the tire may generate asymmetrical centrifugal forces causing additional rotational imbalance on the tire/wheel assembly. Alternatively, under centripetal force of a rotating tire, the mass of the separated tire tread may move farther away from the mass that is not separated causing additional imbalance. The HDPS aspects of the sensor system 100 may be used to detect these non-uniform cylindrical asymmetrical changes and appropriately notify the driver. This information may relate to tire tread separation. The HDPS aspects may be incorporated into the functionality of the third microprocessor 36, for example.

Figure 4:
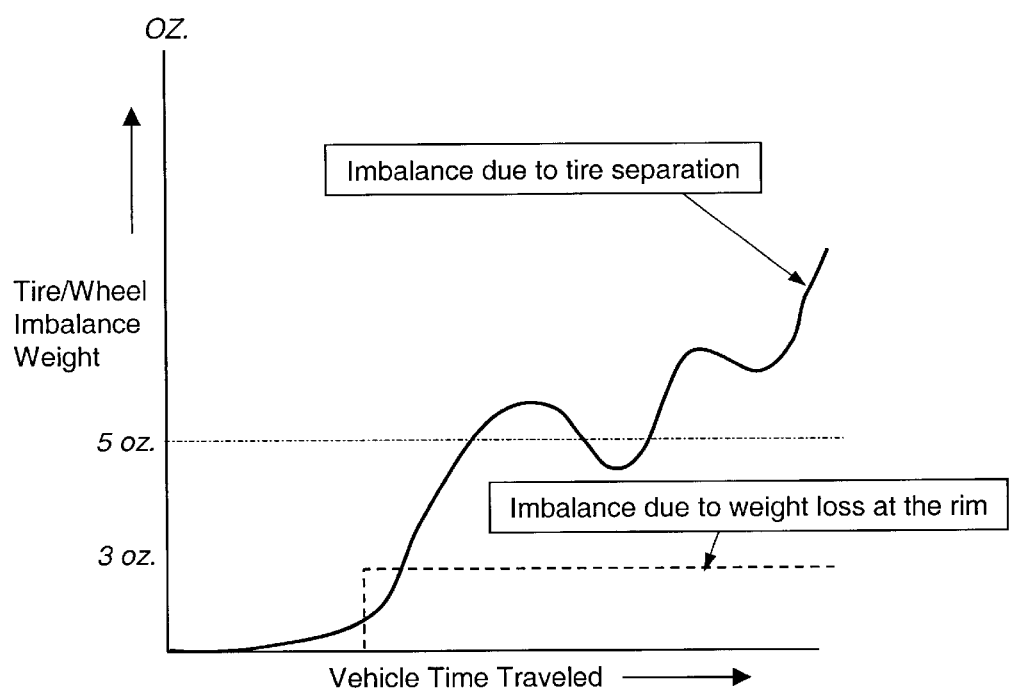
FIG. 4 is a graph showing tire imbalance weight versus vehicle time traveled.

FIG. 4 illustrates a time history of the tire tread separation-based imbalance forces (i.e., both radial and couple-based forces acting on the tire/wheel assembly). The vertical axis represents the tire/wheel imbalance weight (in ounces) and the horizontal axis represents the vehicle time traveled. An increased imbalance weight may be associated with an increase of the tread separation both in a radial direction and an axial direction underneath the tread. An intermediate reduction in imbalance may be due to a possible axi-symmetry generated as a result of the propagation of the separated region all around the periphery under the tire tread.

Embodiments of the present invention may detect the imbalance resulting from the tread separation by measuring a change in the amplitude of the harmonics of the rotational frequency of the tire. The imbalance may be measured using the radial accelerometer 24 and the axial accelerometer 26 (FIG. 2) or the accelerometer 60 (FIG. 3), for example. This data may get communicated to the microprocessor 30 and more particularly to the third microprocessor 36, which may perform the necessary calculation and appropriately notify the driver of these conditions.

Embodiments of the present invention may generate a time history of the imbalance change of a tire/wheel assembly due to sudden loss of the imbalance weight (i.e., the vertical axis in FIG. 4) from the wheel rim. The imbalance weight loss (in a passenger car) is commonly limited to 3 ounces or less, and the imbalance weight loss (in a passenger car) due to tire separation may be approximately 5 ounces (or more). Other values of imbalance weight loss are also possible. As such, the sensor system 100 may operate to send a warning (i.e., audio, video, motion, etc.) to the driver when the detected imbalance is persistently above 5 ounces, for example. In one embodiment, when the imbalance is over 5 ounces for a predetermined time, then the sensor system transmits information regarding the status to the driver. The sensor system 100 may be calibrated (or programmed) so as not to warn the driver each specific instance the imbalance is over 5 ounces since non-tread separating events may cause the imbalance to briefly be greater than 5 ounces. More specifically, the microprocessor 30 (having the functionality of the third microprocessor 36) may monitor the time history of the imbalance (or a difference between a reference imbalance of an ideally balanced tire and the actual imbalance) and may communicate information to the driver (through the transmitter 40, the antenna 42, the receiver 44, and the microprocessor 46) that will display, warn or notify the driver of a problem with the imbalance. That is, the driver may receive a dangerous vehicle driving condition warning indicative of tire tread separation.

Figure 5:
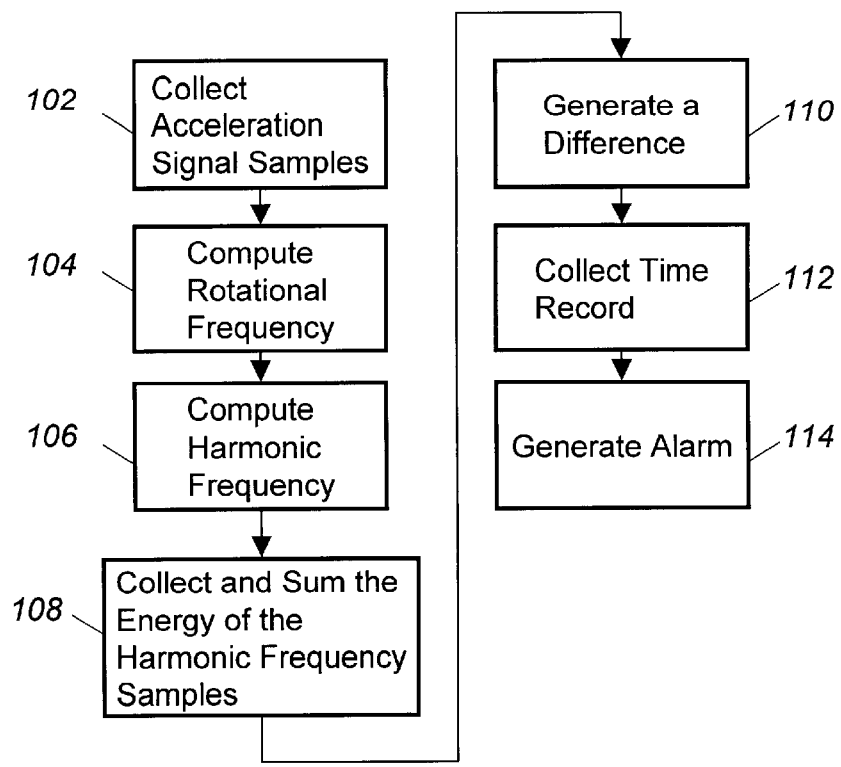
FIG. 5 is a flowchart showing a tire monitoring method in accordance with an example embodiment of the present invention.

FIG. 5 is a flowchart showing a tire monitoring method according to an example embodiment of the present invention. The described method may be for predicting tire tread separation for a tire on a wheel of a vehicle based on detecting the tire mass cylindrical asymmetry. Other methods, operations and orders of operation are also within the scope of the present invention. More specifically, in block 102, the sensor system may collect acceleration signal samples by sensing acceleration on at least one axis (radial, axial or longitudinal) of the tire on the wheel of a vehicle. A rotational frequency of the tire may be computed from the acceleration signal samples in block 104. The sensor system may then calculate (or compute) a harmonic frequency (such as the second harmonic frequency) of the tire from the acceleration signal samples in block 106. The energy of the harmonic frequency samples may be collected and summed within a limited frequency band about the harmonic frequency of the tire in block 108. The sensor system may generate a difference between a stored reference harmonic frequency for an ideally balanced tire and the summed energy of the harmonic frequency samples (from block 108) of the tire in block 110. The sensor system may thereby collect a time record of the energy of the generated differences (block 112) and generate an alarm (or display notification) if the time record of the weighted difference is maintained above a predetermined threshold value for a predetermined amount of time (block 114). The above-described operations may be performed using the accelerometer 60 and the microprocessor 30 having the functionality of the third microprocessor 36. That is, the third microprocessor 36 may perform the above operations and notify the driver (block 114) through use of the transmitter 40, the antenna 42, the receiver 44, the microprocessor 46 and the information display 48 indicative of tire tread separation.

As discussed above, the sensor system 100 may include the temperature and pressure sensor 22 that may be used with respect to the Stress Factor Integrated Measurement aspects of the sensor system 100 to predict future problems. The SFIM aspects may be incorporated into the functionality of the third microprocessor 36 and be used to appropriately notify a driver. The functionality of the SFIM aspects of the sensor system 100 will now be described. During operation, the sensor system 100 may accumulate enough samples of actual high stress factors to perform the associated calculation of progression along the temperature dependent, exponential MTBF path. The sensor system 100 may therefore determine the probability of an imminent tire tread separation failure. More specifically, the microprocessor 30 (having the functionality of the third microprocessor 36) may monitor the possibility of an imminent tire tread separation failure and may communicate information to the driver (through the transmitter 40, the antenna 42, the receiver 44, and the microprocessor 46) that will display, warn or notify the driver of a potential future problem with the tire tread. That is, the driver may receive a dangerous vehicle driving condition warning.

For critical locations associated with the tread/belt attachment interfaces, a total critical absolute temperature (T) at that point may have two contributions as shown in the following Equation 2:

$$T=T_a+T_f,$$

where $T_a$ is the composite ambient temperature associated with the all tire-surrounding ambient thermal forces-external air temperature, cooling from wind or rainwater, heat added from braking assembly, heat or cooling added from road-to-tire contact in hot or cold weather, etc.; and $T_f$ is the temperature rise (relative to ambient) induced by the sidewall mechanical flexure effect of a weight-loaded and air-inflated tire when the vehicle is in motion as the wheel is rotating on the rim.

When the flexure of the sidewall 12 is occurring at high speed, then the total critical temperature (T) near the tread (especially the edges) 16 may rise instantaneously, and possibly by a large amount proportional to the internally stress-induced, flexure-generated heat. The increase of the critical temperature caused by the flexure heating effects may be proportional to the relative heat energy (J) generated per tire revolution times the relative tire revolution rate. This may be represented by the following Equation 3:

$$T_f=c_1 J(V/V_0),$$

where $c_1$ is a constant, V is the vehicle speed relative to an arbitrary reference speed $V_0$, and J may be represented by the following Equation 4:

$$J=c_2(L/L_0)(P_0/P),$$

where L is the relative weight load factor and P is the internal air pressure compared to the recommended reference air pressure $P_0$.

By combining Equation 3 and Equation 4, the critical temperature may be represented as T in the following Equation 5:

$$T=T_a+c(L/L_0)(P_0/P)(V/V_0).$$

Hence, the tread separation failure rate R of Equation 1, which behaves exponentially, may sometimes reach a large enough exponential value (compared to the activation energy of the specific type of manufactured tire), to result in a safety hazard. Factors affecting this may include: an ambient absolute temperature of the local environment, the highway air temperature, the road conditions, and heavy continuous braking. For example, the ambient effects from the desert and mountains over a season may vary the absolute temperature by as much as 60–70 degrees. Additional factors affecting the tread separation failure rate may also include the weight of the load of passengers, baggage, etc. For example, the load may vary by up to two times the load based on passenger, gas, and baggage. Still another factor is that of the vehicle speed on the highway that may vary as much as three times as compared to a 30 mph speed. Still further, the pressure may vary over a range of two times or more depending on the amount of a leak.

A tire is normally designed for specific vehicle operating conditions; however, many of these adverse conditions may cause higher critical temperatures to occur.

The sensor system 100 (and more particularly the SFIM aspects) may monitor the entire set or any desired subset of these conditions (the ambient air temperature inside the tire, the pressure, the load, the vehicle speed, etc.) using any combination of mechanical and electrical sensors, including motion (accelerometers) and efficient microelectromechanical (MEMS) devices. An operating interval sampling technique may be employed for Equation 1 and summed to generate a composite time record of the tire stress operating conditions. For example, the composite time record may be represented by the following Equation $7(tR)_1+(tR)_2+\ldots(tR)_n=Y$=accumulated failure rate metric, where the Ith time interval sample $(tR)_1$ is the product of the interval time duration and the calculated failure rate of that interval based on the in-tire measured stress factors as described in the above equations. When the cumulative sum Y reaches a dangerous level of accumulated stress, then the sensor system 100 (having the functionality of the third microprocessor 36) may operate to send a warning to the driver indicating that the tire should be checked for observable damage. More specifically, the microprocessor 30 (having the functionality of the third microprocessor 36) may monitor and/or determine the cumulative sum Y and may communicate information to the driver (through the transmitter 40, the antenna 42, the receiver 44, and the microprocessor 46) that will display or notify the driver of a potential problem.

Figure 6:
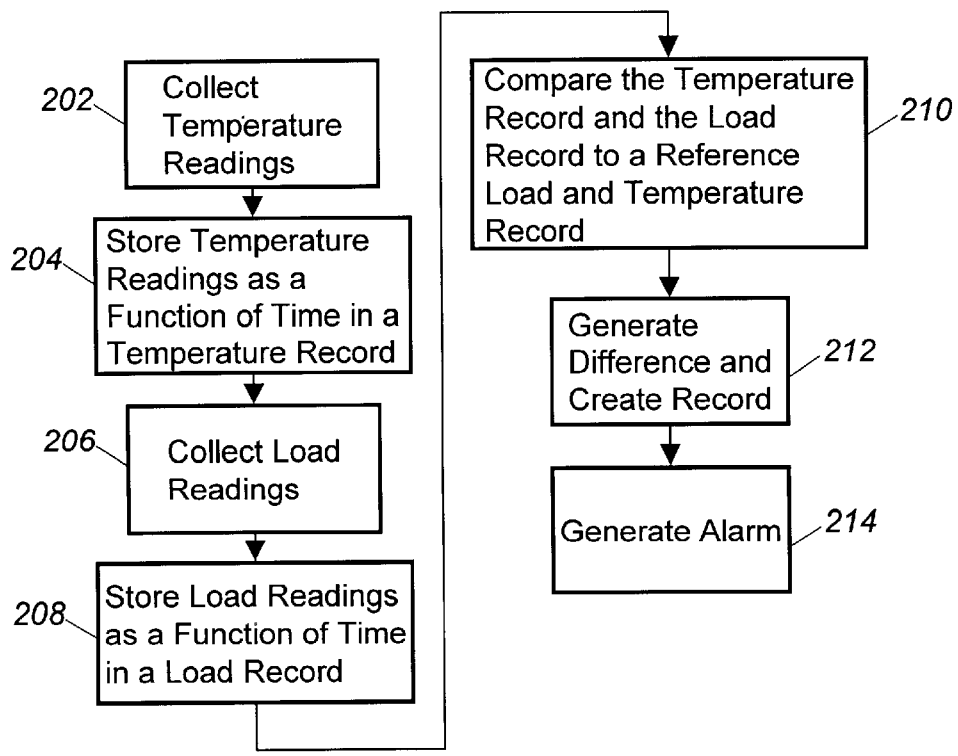
FIG. 6 is a flowchart showing a tire monitoring method in accordance with an example embodiment of the present invention.

FIG. 6 is a flowchart showing a tire monitoring method according to an example embodiment of the present invention. The described method may be for predicting tire tread separation for a tire on a wheel of a vehicle based on detecting tire temperature and tire load (i.e., two parameters). Other parameters or combinations of parameters may be similarly used. Additionally, other methods, operations and orders of operation are also within the scope of the present invention.

More specifically, in block 202, the sensor system may collect temperature readings of the tire as a function of time. The temperature readings may be stored as a function of time in a temperature history record in block 204. The sensor system may collect load readings in block 206 and store the load readings as a function of time in a load history record (block 208). The stored temperature record and the stored load record may be compared to a reference load and temperature record in block 210. The reference load and temperature record may be based on an ideal tire tested under certain parameters. This data may be appropriately stored in memory associated with the sensor system. The sensor system may determine a difference between the stored temperature record and the stored load record over time with the reference load and temperature record in block 212. The sensor system may thereafter generate an alarm if the difference is maintained above a predetermined threshold value for a predetermined amount of time in block 214. That is, an alarm may be generated if the measured parameters predict a future problem. The above-described operations may be performed using the accelerometer 60 and the microprocessor 30 having the functionality of the third microprocessor 36. That is, the third microprocessor 36 may perform the above operations and notify the driver (block 214) through the use of the transmitter 40, the antenna 42, the receiver 44, the microprocessor 46 and the information display 48.

The sensor system 100 may include both the HDPS aspects and the SFIM aspects as described above and may function cooperatively, and on demand, based on how often and at what confidence level the driver desires to be informed. As discussed above, information can be provided by a wireless (or direct) data link to the interior of the passenger compartment.

Embodiments of the present invention are also applicable to tire deflection. Tire deflection is discussed in U.S. Pat. No. 5,754,102, the subject matter of which is incorporated herein by reference. Tire deflection is an aggregate indicator of tire load, pressure and temperature parameters under which a tire is running. A separate tire deflection versus speed algorithm may be used in providing a warning to a driver about whether the tire deflection has exceeded the predetermined dangerous deflection limits that may lead to tire tread separation, and whether the driver is driving under tire conditions that are not recommended.

Figure 7:
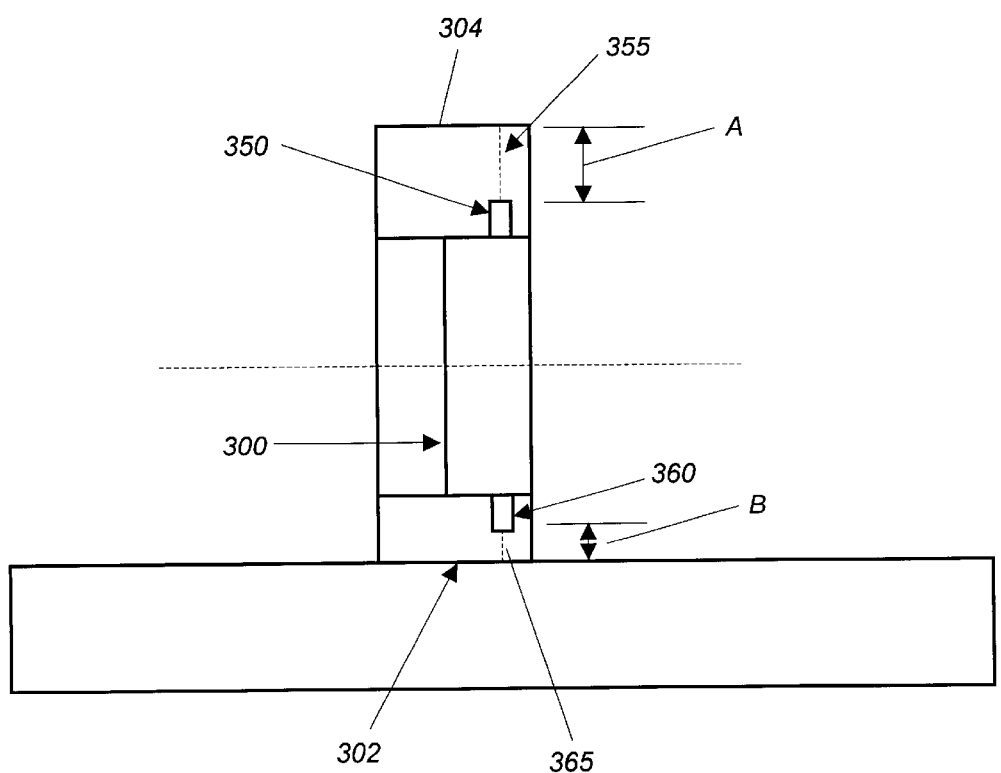
FIG. 7 is a diagram showing tire deflection measurement in accordance with an example embodiment of the present invention.

The direct measurement of tire deflection may include use of a non-contact ranging sensor that uses optical or ultrasound beams. FIG. 7 shows an example of how a ranging sensor may be used in accordance with an example embodiment of the present invention. Other embodiments and configurations are also within the scope of the present invention. FIG. 7 shows a ranging sensor 350 located at a topmost position of a wheel 300 and the ranging sensor 350 located at a lowest position of the wheel 300. FIG. 7 shows two locations of the sensor 350 merely for illustration purposes as the ranging sensor may be provided as one sensor. The ranging sensor 350 may be placed on (or within) the sensor system 100. While within the tire, the ranging sensor's line of sight may be pointed at the inner surface of the tire. While making the range measurements, the ranging sensor 350 may bounce the energy of its beam from the inner surface of the tire. A standard triangulation scheme or time of flight measurement may provide the distance between the inner surface of the tire and the ranging sensor 350. This range measurement of the inner surface of the tire may be made synchronous with the location of the ranging sensor 350. When the ranging sensor 350 is at the top most location in the tire (determined from the signature of the radial accelerometer), the sensor would bounce a beam 355 off an unloaded tire surface 304 to measure the unloaded tire range. This distance may be shown by the arrow A. When the ranging sensor 350 is at the bottom most location in the tire near the ground (determined from the signature of the radial accelerometer), the sensor 350 may bounce a beam 365 off a loaded tire surface 302 to make measurements for a loaded tire within a contact patch range. This distance may be shown by the arrow B. A difference between these two ranges (i.e., the distance A minus the distance B) may provide the amount of tire deflection. With multiple range measurements, a detailed map of the tire deflection within the tire contact patch may also be constructed and integrated within the algorithm for providing warnings for unusual driving conditions.

The difference between the distance A and the distance B may be monitored over a time period. A time record of the difference signal may be computed and stored and an alarm or warning indication may be provided if the time record of the difference signal is maintained above a predetermined threshold value for a predetermined amount of time. This difference signal may also be examined along with speed over a time period to they are maintained above a predetermined threshold value for a predetermined amount of time.

Any reference in the above description to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the knowledge of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Further, embodiments of the present invention or portions of embodiments of the present invention may be practiced as a software invention, implemented in the form of a machine-readable medium having stored thereon at least one sequence of instructions that, when executed, causes a machine to effect the invention. With respect to the term "machine", such term should be construed broadly as encompassing all types of machines, e.g., a non-exhaustive listing including: computing machines, non-computing machines, communication machines, etc. Similarly, with respect to the term "machine-readable medium", such term should be construed as encompassing a broad spectrum of mediums, e.g., a non-exhaustive listing including: magnetic medium (floppy disks, hard disks, magnetic tape, etc.), optical medium (CD-ROMs, DVD-ROMs, etc), etc.

A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A tire monitoring system comprising:
a sensor to monitor a parameter of a tire of a vehicle;
a memory device to receive signals from said sensor indicative of said parameter over time and to store said received signals; and
a processing device to couple to said memory device and to compare information regarding said parameter over time with a reference threshold of said parameter over time.

2. The system of claim 1, further comprising a display device to display information regarding said tire.

3. The system of claim 1, wherein said processing device further to transmit information to said display device based on said comparing.

4. The system of claim 1, wherein said sensor comprises one of a radial accelerometer to monitor radial acceleration, an axial accelerometer to monitor axial acceleration and a longitudinal accelerometer to monitor longitudinal acceleration.

5. The system of claim 1, wherein said sensor comprises a tire pressure sensor.

6. The system of claim 1, wherein said sensor comprises a temperature sensor.

7. The system of claim 1, wherein said sensor comprises a speed sensor.

8. The system of claim 1, wherein said memory device further to store information regarding said reference threshold of said parameter over time.

9. The system of claim 1, wherein said processing device to determine tire tread failure based on said comparing.

10. A tire monitoring method comprising:
monitoring a parameter of a tire over time;
comparing said monitored parameter over time with a reference of said parameter over time; and
determining tire tread failure based on said comparing.

11. The method of claim 1, wherein said parameter comprises acceleration along an axis of said tire.

12. The method of claim 11, wherein said axis comprises one of a radial axis, a longitudinal axis and a radial axis.

13. The method of claim 1, wherein said parameter comprises tire imbalance.

14. The method of claim 13, wherein said monitoring comprises:
obtaining data regarding acceleration of said tire;
calculating a harmonic frequency based on said obtained data regarding acceleration of said tire; and
storing information regarding the harmonic frequency in a time record.

15. The method of claim 14, wherein said comparing comprises comparing said stored information with a stored baseline harmonic frequency.

16. The method of claim 15, further comprising generating an alarm if said stored information is maintained above the stored base line harmonic frequency.

17. The method of claim 1, wherein said parameter comprises a temperature inside said tire.

18. The method of claim 1, wherein said parameter comprises one of speed of said tire and a load.

19. The method of claim 1, wherein said parameter comprises tire pressure.

20. The method of claim 1, further comprising transmitting information to a driver of said vehicle if said monitored parameter exceeds said reference of said parameter for a predetermined amount of time.

21. The method of claim 1, wherein said parameter comprises a difference between a maximum deflection and a minimum deflection.

22. A tire monitoring method comprising:

storing a time history of a parameter of a tire;

comparing said stored time history with a reference time history: and determining tire tread failure based on said comparison.

23. The method of claim 22, wherein said parameter comprises acceleration along an axis of said tire.

24. The method of claim 23, wherein said axis comprises one of a radial axis, a longitudinal axis and a radial axis.

25. The method of claim 22, wherein said parameter comprises tire imbalance.

26. The method of claim 22, wherein said parameter comprises a temperature inside said tire.

27. The method of claim 22, wherein said parameter comprises one of speed of said tire and a load.

28. The method of claim 22, wherein said parameter comprises tire pressure.

29. The method of claim 22, further comprising transmitting information to a driver of a vehicle if said stored parameter in said time history exceeds said reference time history for a predetermined amount of time.

30. The method of claim 22, wherein said parameter comprises a difference between a maximum deflection value and a minimum deflection value.

31. A tire monitoring system to monitor a parameter of said tire over time and to provide a tire separation warning if said parameter exceeds a threshold value for a predetermined amount of time.

32. The tire monitoring system of claim 31, wherein said tire monitoring system comprises a display device to display information regarding said tire.

33. The tire monitoring system of claim 31, wherein said tire monitoring system comprises one of a radial accelerometer to monitor radial acceleration, an axial accelerometer to monitor axial acceleration and a longitudinal accelerometer to monitor longitudinal acceleration.

34. The tire monitoring system of claim 31, wherein said tire monitoring system comprises a tire pressure sensor.

35. The tire monitoring system of claim 31, wherein said tire monitoring system comprises a temperature sensor.

36. The tire monitoring system of claim 31, wherein said tire monitoring system comprises a speed sensor.

37. A tire monitoring method comprising:

collecting information regarding acceleration of said tire;

storing data regarding said collected information; and outputting a tire separation warning if said stored data exceeds a threshold for a predetermined amount of time.

38. The method of claim 37, wherein said threshold comprises a value that changes over time.

* * * * *

UNITED STATES PATENT AND TRADEMARK OFFICE
CERTIFICATE OF CORRECTION

PATENT NO.   : 6,741,169 B2
DATED        : May 25, 2004
INVENTOR(S)  : Kiran R. Magiawala et al.

It is certified that error appears in the above-identified patent and that said Letters Patent is hereby corrected as shown below:

Column 12,
Lines 36, 40, 55, 57, 59, 61 and 65, after "claim" change "1" to -- 10 --.

Signed and Sealed this

Twenty-first Day of June, 2005

JON W. DUDAS
*Director of the United States Patent and Trademark Office*